United States Patent [19]

Fedde et al.

[11] Patent Number: 4,506,385

[45] Date of Patent: Mar. 19, 1985

[54] RADIO RECEPTION PATH MONITOR FOR A DIVERSITY SYSTEM

[75] Inventors: Chris D. Fedde, Cedar Rapids, Iowa; Dennis L. Carter, Mountain View, Calif.

[73] Assignee: Rockwell International Corporation, El Segundo, Calif.

[21] Appl. No.: 452,999

[22] Filed: Dec. 27, 1982

[51] Int. Cl.³ .............................................. H04B 17/00
[52] U.S. Cl. .................................... 455/226; 371/68; 375/10; 375/100; 455/67
[58] Field of Search ....................... 455/52, 226, 67, 9, 455/10, 17, 18; 375/10, 40, 100; 371/68, 69

[56] References Cited

U.S. PATENT DOCUMENTS

| | | | |
|---|---|---|---|
| 3,105,955 | 10/1963 | Mauchly | 371/69 |
| 3,633,162 | 1/1972 | Findeisen | 371/68 |
| 4,063,174 | 12/1977 | Gupta et al. | 455/52 |
| 4,083,009 | 4/1978 | Bickford et al. | 375/100 |
| 4,128,809 | 12/1978 | Kage | 375/100 |
| 4,349,914 | 9/1982 | Evans | 375/100 |

Primary Examiner—Marc E. Bookbinder
Attorney, Agent, or Firm—Robert C. Mayes; George A. Montanye; H. Fredrick Hamann

[57] ABSTRACT

Disclosed is an antenna monitor for a diversity communication system having the capability of detecting differences in reception characteristics between a plurality of reception paths or modes and storing that failure information in a non-volatile memory store. Subsequently, the memory is read to determine if the antenna systems are functioning improperly.

2 Claims, 1 Drawing Figure

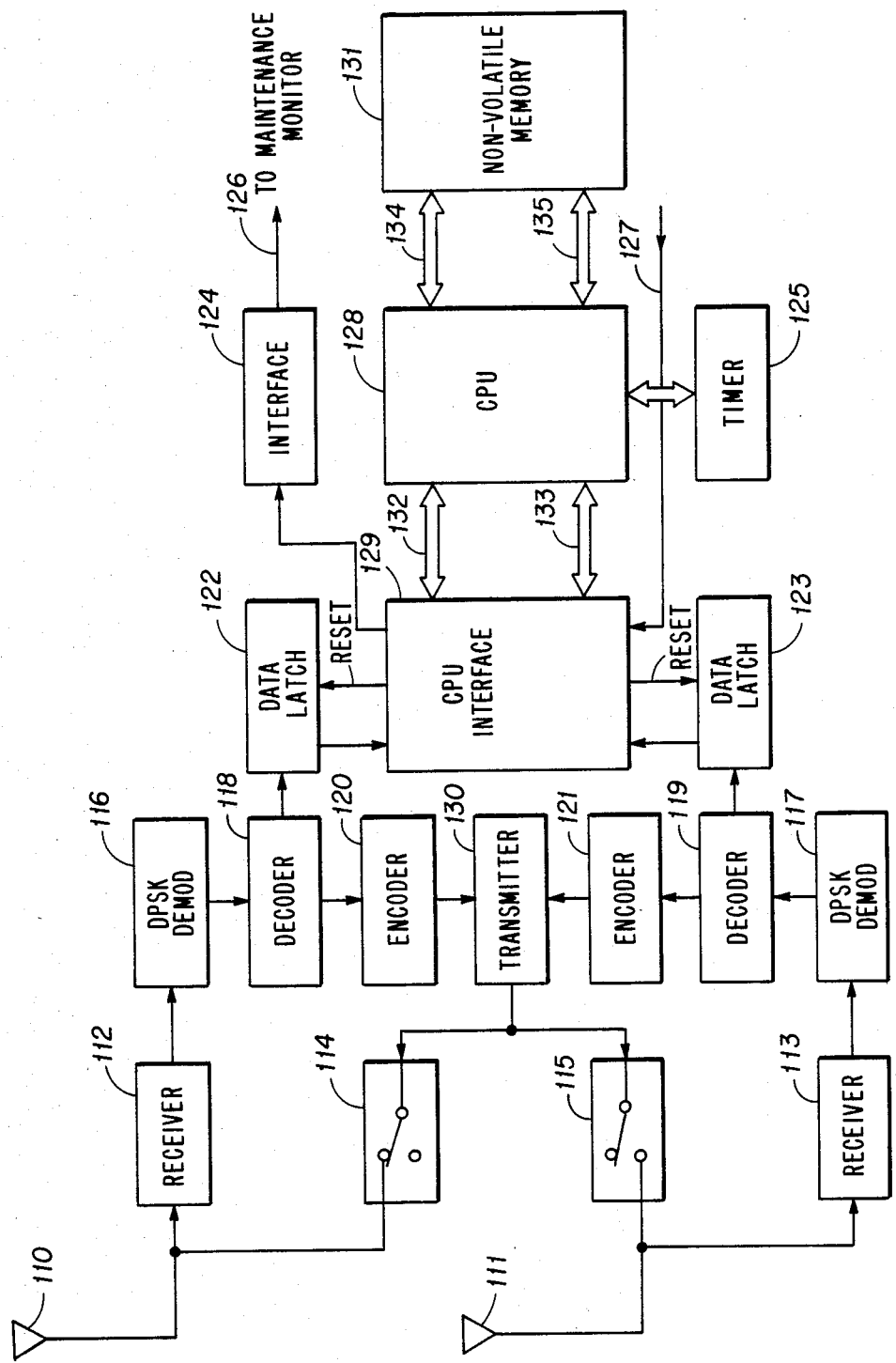

RADIO RECEPTION PATH MONITOR FOR A DIVERSITY SYSTEM

BACKGROUND OF THE INVENTION

This invention relates to radio communications equipment in general and to system failure monitors in communications equipment in particular.

The increase in complexity in advanced electronic communication equipment has brought with it the need for improved maintenance techniques and methods necessary to keep an item in proper condition or to restore it to proper condition once it has failed. This includes a variety of problems particularly related to the increasing use of extremely complex solid state elements and the use of digital techniques.

The use of these advanced communications devices has particular application to aviation in that significant advances in data transfer rates, weight and cost considerations, as well as reliability, can be made through these technical advances. However, the aircraft environment under normal operating conditions provides an extremely varied temperature, pressure and mechanical stress environment. Vibration caused by the engines of the aircraft as well as repeated mechanical forces caused by landings and other normal flight-encountered air turbulence, have particularly caused problems in maintaining antenna systems on the aircraft. Repeated temperature fluctuations additionally have caused problems in antenna mounting and electrical connections.

Diversity systems have been developed primarily to reduce fading characteristics inherent in essentially all forms of electromagnetic radiation communication. Fading is a drift in the level of received radio signals beyond intelligibility. It is often caused by changes in the upper atmosphere or by increases in distance from the transmitter to the receiver; or by obstruction in the signal path, an additional reason for development of a diversity system to provide a receiving antenna which will always be illuminated by the transmitted signal. A good example of this type of diversity system is the discrete address beacom system (DABS) developed for providing the aircraft surveillance and communications necessary to support aircraft traffic control automation in the dense air traffic environments expected in the future. An excellent background of the DABS concept is provided in the Federal Aviation Administration Report No. FAA-RD-8041 published April 1980. Chapters 4 and 5 of that publication have particular application to the implementation of the present invention and are hereby incorporated by reference thereto.

The DABS transponder mounted in the aircraft, as envisaged by the above reference FAA report, incorporates the use of a diversity receiver having two antennas, one mounted on the upper side of the aircraft, and a second mounted on the underside of the aircraft. This will enable either or both of the receiving antennas to be constantly illuminated within the operating range of the ground based transmitter, irrespective of aircraft attitude relative to the horizon, speed of the aircraft, or relative position to the ground-based transmitter, notwithstanding the fading effects previously discussed.

If, however, one of the antennas fails leaving the other antenna receiver system in operation, it is desirable, for maximum serviceability of the system, to detect this problem as soon as possible. For example, if an aircraft makes a flight wherein the uppermost antenna receiver apparatus is never utilized, primarily because the lower mounted antenna apparatus remains constantly illuminated, the inoperability of the upper mounted antenna will go essentially undetected unless the aircraft on a subsequent flight assumes an attitude which will block the lower antenna from reception and, as can be clearly seen, this is the precise attitude and time of a loss of reception (such as a climb-out on take-off) when the loss in communications could be catastrophic.

A significant contributing element to the maintenance problem is the intermittent nature of certain types of failures. For example, a broken antenna connector cable may provide a low impedance contact at ground level; however, upon attaining altitude and after a period of flight wherein the aircraft is exposed to much lower ambient temperature than experienced at ground level, the broken connector becomes separated and essentially appears as a high impedance or open contact. Upon returning to ground, the warmer temperatures cause the broken connector to once again come into contact and thereby make the receiver apparatus functional once again. The first problem, that is of detection, become difficult utilizing a ground test procedure because in fact the failure only exists under circumstances attained during flight. A second problem exists in attempting to locate and determine the cause of the failure once the fact of a failure has been established. This intermittent type failure poses a significant safety hazard in a crowded air traffic environment, primarily because of the difficulty of detection of such failure.

SUMMARY OF THE INVENTION

Accordingly, it is an object of the present invention to provide a maintenance monitor capable of detecting a discrepancy in the integrity of antenna systems used in a diversity communication system.

A yet further object of the invention is to provide a continuously monitoring apparatus capable of providing the history of functional capability of a diversity communication system.

Briefly, in accordance with the present invention, an antenna system monitor in a diversity communication apparatus is disclosed having means for receiving a plurality of signals containing substantially similar information, means for comparing at least two of the signals to detect dissimilarities in the information in the received signals, and means for relating detected dissimilarities to a failure in the means for receiving. Essentially, this requires the recording of the occurrence of properly received signals from both diversity antenna systems simultaneously, and storing that information for subsequent examination.

An antenna function monitor apparatus in a discrete address beacon system transponder comprises at least two antennas; at least two receivers, each coupled to a different one of the antennas; at least two decoders, each coupled to a different one of the receivers; at least two data latches, each coupled to a different one of the decoders wherein a properly decoded signal in one of the decoders triggers the respective latch; and means for transferring the data stored in all of the latches into a non-volatile memory and for resetting the data latches. The data stored in the latches is transferred on a periodic basis wherein the period is long enough to provide relatively large numbers of signals to be received by the respective antennas. A failure to receive any of the large number of transmitted signals by one or both of the antenna-receiver combinations is thereafter stored as a failure indication in non-volatile memory on-board the aircraft.

BRIEF DESCRIPTION OF THE DRAWING

A functional block diagram of a portion of a DABS transponder having incorporated the present invention is shown wherein the added elements required to practice the present invention are related to the already-existing transponder elements.

DETAILED DESCRIPTION OF THE INVENTION

Referring now to the drawing, antenna 110 is mounted on the upper side of an aircraft and antenna 111 is mounted on the under side of the same aircraft. The principle elements of the DABS transponder are interconnected in a similar manner to that depicted in FIG. 4-2 on page 77 of the incorporated FAA publication. Receiver 112 has an input connection from antenna 110 and amplifies received signals for input into the differential phase shift keying demodulator 116 and thereafter into the decoder 118. This structure is essentialy similar to the typical DABS transponder depicted in FIGS. 4-2 and 4-3 of the above-referenced FAA publication. FIG. 4-3 however utilizes a single DPSK demodulator. As will be shown, alternative embodiments as shown in FIGS. 4-2 and 4-3 are easily adapted to incorporate the present invention. For purposes of complete explanation of the present invention and to avoid confusion, a transponder system as shown in the present application utilizing two demodulators, two decoders, and two encoders, will be utilized to demonstrate the interconnection of the present invention to a DABS transponder.

Receiver 113 similarly receives a signal from antenna 111 and amplifies it for input into the DPSK demodulator 117. That signal is therafter input into the decoder 119. Under normal properly operating circumstances, the signals received by antennas 110 and 111 will be substantially the same and will occur simultaneously. Should antenna 111 or alternatively antenna 110 not receive a signal, the transponder system as described in the incorporated FAA document is designed to receive the required information and respond on the antenna having the strongest signal. In the worst case circumstance where one antenna fails completely, the transmitter is designed to continuously respond on the operating antenna. Transmitter 130 is coupled to encoder 120 and encoder 121 and together with selection logic and other control circuitry of the transponder (not shown) the proper antenna for transmission is connected utilizing switch 114 and 115 whch are controlled by the selection logic and thereafter transmitter 130 is able to respond to the interrogation signal.

The present invention, however, is concerned with properly decoded signals only. A properly decoded signal from decoder 118 establishes a "functional" signal to be input into data latch 122. Similarly, decoder 119 also registers a properly received decode into data latch 123. Both data latch 122 and 123, in the simplest embodiment, are simple flip-flop storage elements consisting of two cross-coupled logic gates that store a pulse applied to one logic input until a "reset" pulse is applied to the other input. The latched data is controlled with respect to periodic readouts into the CPU interface 129 by software in the CPU 128. The timer 125 controls the CPU operation and the software control of the data latches is shown in Table 1.

TABLE 1

| Antenna System Monitor Software Description |
|---|
| INITIALIZE |
| RESET ANTENNA DATA LATCH A |
| RESET ANTENNA DATA LATCH B |
| START INTERVAL TIMER |
| TEST TIMER |
| Subroutine: If timer not timed out, go to TEST TIMER |
| TEST WHEELS DOWN |
| Subroutine: If wheels down, go to RESET ANTENNA DATA LATCH A |
| READ DATA LATCH ANTENNA A |
| READ DATA LATCH ANTENNA B |
| INCREMENT NON-VOLATILE MEMORY A WITH DATA ANTENNA A |
| INCREMENT NON-VOLATILE MEMORY B WITH DATA ANTENNA B |
| Go to RESET ANTENNA DATA LATCH A |

The CPU interface 129, the CPU 128, and the non-volatile memory 131 in one embodiment are all incorporated into a typical DABS transponder utilizing microprocessor control. Alternatively, these units may be added to provide the antenna monitor function in a unit either not already having a microprocessor or having a system not readily adapted to attaching and controlling the latches 122 and 123 as herein described. The RS-232 interface 124 is shown connected to the CPU interface and is provided for outputting data on line 126 to a plug-in test monitor when the aircraft is undergoing maintenance on the ground. Similarly, timer 125 is provided for clocking the CPU in a typical application and both timer 125 and interface 124 while utilized in conjunction with the present invention have additional uses in the control and operation of the transponder itself in this exemplary embodiment and are utlized in a typical manner. The wheels down signal 127 is provided by a sensor capable of detecting when the aircraft is on the ground. This sensor has been referred to as a "squat switch" and detects whether or not the aircraft is on the ground or, if in fact, there is no weight on the wheels and the aircraft is airborne. As can be seen in Table 1, the use of the wheels down or "squat switch" in the software control program for the antenna monitor allows the CPU to conserve memory by only storing operational information during the actual airborne period of the aircraft.

Data between the CPU and CPU interface is carried on bus 132, and between the CPU and memory on bus 134. Likewise the address bus 133 couples the CPU to the CPU interface, while address bus 135 couples the CPU to the memory 131.

In actual operation, the period set for reading latches 123 and 122 is set at approximately 10 to 15 minutes to allow for hundreds or thousands of DABS interrogations from the ground-based unit to be received by the antennas. This enables the decoders to provide a "functional" input into the data latch during the 10 minute period of flight and if both antenna receiver systems are operational (a single properly decoded signal during the 10 minute period) both data latches will have "functional" data stored therein until the conclusion of that 10 minute period. Thereafter, the CPU interface 129 reads the condition of the latch and upon software command by the CPU, the interface can then transfer the data to the non-volatile memory 131. The 10 and 15 minute interval is somewhat arbitrary, however it must be long enough to provide for a period of flight such as climb-out on take-off or a maneuver wherein one of the antennas is temporarily masked during the maneuver, and yet allow both antennas to once again become illuminated prior to completion of the 10 to 15 minute interval. If, however, during the entire period one of the antenna receiver systems does not decode a signal, then that is a "non-functional" input to the data latch and that then is subsequently stored into the non-volatile memory in a similar fashion. The non-volatile memory utilized has the advantages of being programmable while in the air and additionally maintaining memory should a power failure occur. Electrically erasable programmable read only memories (EEPROMs) or electrically alterable programmable read only memories (EA-ROMs) are currently available on the market and are suitable for this purpose.

Once the aircraft has landed, the maintenance technician installs a test unit by plugging into the RS-232 interface 124 or alternative digital interface and by directing the CPU 128 to read out the contents of memory 131. The data obtained by the data latches during each of the periods of flight is compared to determine if during one or more of those periods one of the antennas was operating while the other was not. In this manner, the technician is immediately apprised of the fact that there is an intermittent failure presumably at the low temperature portions at high altitude if in fact a temperature fluctuation has caused the failures.

An alternative method of connecting the data latches to a single DPSK demodulator and decoder unit is provided by connecting data latch 122 and 123 to the video processor stage of the diversity transponder and providing for a readout and reset of the latches at a timed interval. The decoder then functions to enable the latches to input data from the video processors.

Additional applications include, but are not limited to, multimode communication systems such as a transmitter-receiver combination utilizing two distinct frequencies to establish positive communications without regard to potential fading effects, and communication systems having different modes of primary communication, for example, a system utilizing groundwave propagation in conjunction with skywave propagation to maintain positive communications.

An alternative embodiment in a time diversity apparatus wherein a signal is repeated over and over again to insure positive communication where the present invention is utilized to detect when, if ever, the signal is not properly received. The technician, by utilizing the information gained from the present invention, can then locate and eliminate the source of the failure of communication if it is in fact a structural failure or, at least identify the fading characteristic as that caused by atmospheric disturbance or for other reasons. In this embodiment, only one data latch is required and it is operated at a more frequent time interval relative to the frequency of the repeated transmissions so as to provide a continuous monitoring capability.

Likewise, polarity diversity systems utilize separate antenna receiving structures, although they may be combined in some embodiments and the present invention essentially as described herein can be utilized to detect structural failures in the described manner.

While this invention has been described with reference to an illustrative embodiment, it is not intended that this description be construed in a limiting sense. Various modifications of the illustrative embodiment, as well as other embodiments of the invention, will be apparent to persons skilled in the art upon reference to this description. It is therefore contemplated that the appended claims will cover any such modifications of embodiments as fall within the true scope of the invention.

What is claimed is:

1. A radio reception path monitor apparatus comprising:
   a. at least two antennas;
   b. at least two receivers, each coupled to a different one of said antennas;
   c. at least two decoders, each coupled to a different one of said receivers;
   d. at least two latches, each coupled to a different one of said decoders wherein a properly decoded signal in one of said decoders triggers the respective latch; and
   e. means for transferring the state of said latches into a non-volatile memory and for resetting said latches.

2. A radio reception path monitor apparatus as in claim 1 wherein said transferring means is operable to read out said latch states from said non-volatile memory and further comprising a maintenance monitor coupled to said transferring means for indicating periods of failed signal decode functioning upon readout of latch states stored in said memory corresponding to a failure in one of said at least two antenna, receiver, and decoder combinations.

* * * * *